Patented Nov. 2, 1943

2,333,623

UNITED STATES PATENT OFFICE 2,333,623

TEXTILE TREATING CHEMICAL AND
PROCESS OF MAKING IT

John B. Rust, Verona, N. J., assignor to Montclair Research Corporation, a corporation of New Jersey No Drawing. Application May 6, 1942,
Serial No. 441,970

8 Claims. (Cl. 260—295)

This invention relates to water-soluble reaction products of a tertiary amine with the product formed from the reaction of a nitrile with a long chain fatty acid chloride and formaldehyde, said products being valuable in treating textile fabrics. The invention also relates to the process of making such products and is a continuation in part of my copending application Serial Number 392,937 filed May 10, 1941.

According to the process of the present invention an organic nitrile is reacted with a long chain fatty acid chloride having a carbon chain of more than about 9 carbon atoms in the presence of formaldehyde. The reaction product so formed is then reacted with a tertiary amine such as pyridine although I have also found that the nitrile, acid chloride, formaldehyde and tertiary amine may be reacted all together to give satisfactory water-soluble products. The reaction may be carried out at temperatures ranging from 50° C. or 60° C. up to 110° C. or slightly higher for periods of time varying between 30 minutes to about twenty hours. As tertiary amines I prefer to employ pyridine, quinoline, trimethyl amine, alpha picoline or technical mixtures such as pyridine bases which contain picoline and lutidine in addition to pyridine.

The water-soluble products of the present invention are admirably suited for treating textile fabrics to which they impart a soft suede hand. Furthermore, it has been found that if a cotton, rayon, acetate or wool fabric which has been treated with a 1% to 20% solution of the water-soluble products of the present invention is heated at an elevated temperature of above 100° C. and preferably between 140° C. and 170° C., the product becomes fixed on the fabric and imparts thereto an excellent water-repellent finish.

As the nitrile component of the present invention I may employ malononitrile, succinonitrile, acetonitrile, acrylonitrile, propionitrile, cyclic and heterocyclic nitriles such as benzonitrile, nicotinonitrile and complex nitriles such as methyleneaminoacetonitrile and the like. Such nitriles contain less than 9 carbon atoms. As the acid chloride component I may employ, for example, decanoyl chloride, dodecanoyl chloride, palmityl chloride (hexadecanoyl chloride), stearyl chloride (octadecanoyl chloride), behenyl chloride (docosanoyl chloride) and the like, or mixtures thereof.

The following examples are given to illustrate the products and process of the present invention. All proportions are given in parts by weight.

Example 1.—66.5 parts of palmityl chloride, 25 parts of benzonitrile, 14.6 parts of paraformaldehyde and 1 part of zinc chloride were heated together with constant agitation at 75°–80° C. for 21 hours. The product was then cooled to room temperature and 19.2 parts of pyridine were slowly added with agitation. The temperature rose to 55° C. during the addition and the product then heated at 70°–75° C. for 1½ hours, then for 15 hours at 65° C. The material was readily soluble in water to give strongly foaming solutions. At room temperature it was a hard, rather high melting, light yellow wax.

Example 2.—274.5 parts of palmityl chloride, 55 parts of propionitrile, 45 parts of paraformaldehyde, and 2.7 parts of zinc chloride were heated together with rapid agitation at 77° C. for 20 hours. The reaction was then allowed to cool to about 30° C. and 79 parts of pyridine were slowly added. The temperature rose during this addition to about 55° C. and the product was then heated at 60°–65° C. for 2½ hours. The product was somewhat soft and waxy at room temperature. It was readily soluble in water to give strongly foaming solutions.

In the process of the present invention it is possible to carry on the reaction in the presence of the tertiary amine.

Example 3.—19.5 parts of methyleneaminoacetonitrile, 8.5 parts of paraformaldehyde and 50 parts of pyridine were heated to obtain a solution of the nitrile and a suspension of the paraform in the pyridine. 86 parts of stearyl chloride were then added slowly over a period of 20 minutes maintaining the temperature below 100° C. When all of the acid chloride had been added the material was viscous and clear. It was then heated at 60°–65° C. for 1 hour. The product at room temperature was a hard, light yellow wax which was readily soluble in water to form strongly foaming solutions.

The materials of the present invention when applied to cotton fabrics, dried and baked, give water repellent fabrics having standard spray ratings of from 90 to 95. In order to increase the initial rating to 100, small amounts of wax may be incorporated in the acid chlorides. This is exemplified in the following example as well as the use of an inert diluent which may be present during the reaction.

Example 4.—75 parts of stearic acid (a grade known to the trade as Hard Hyodol acids), 25 parts of candelilla wax and 20 parts of phosphorus trichloride were heated at 60° to 80° C. for 4 hours. The resulting acid chloride mixture was decanted from the lower phosphorous acid layer. 23 parts of methyleneaminoacetonitrile, 10 parts of paraformaldehyde, 45 parts of pyridine and 15 parts of dioxan were heated to about 80° C. to obtain solution of the nitrile. The acid chlorides as formed above were then added slowly with rapid agitation over a period of about 20 to 30 minutes maintaining the temperature below 100° C. When all of the acid chlorides had been added the viscous mixture was heated at 75°–80° C. for 1 hour with agitation. At room temperature the material was a hard, light brown wax which dissolved readily in water and in 1% to 10% solution at 70°–80° C. gave clear, opalescent dispersions.

In employing the compounds of the present invention on textile fabrics as water repellents I have found that the preferable procedure is to dissolve the material in water to form about a 5% solution of solids, although from 1% to 10% may be used if desired. The impregnated fabric is dried at a relatively low temperature (below 100° C.) for a short time, then baked at above 100° C. and preferably at 120° C. to 170° C. for from 1 to 20 minutes.

As an illustration, the materials formed as described in Examples 3 and 4 were dissolved in water to form a solution containing 6% solids. An olive drab dyed mercerized poplin was impregnated with the solutions, squeezed between rubber rolls to remove the excess solution, dried at about 90°–100° C. in a current of air and baked at 160°–165° C. for 2 minutes. The treated fabric was given a preliminary soaping in soap and water at 60° C. to remove unreacted compounds, then rinsed and dried. Standard spray readings were taken on the fabric according to well-established methods as outlined in my copending application Serial Number 392,937 filed May 10, 1941. The fabric treated with the product of Example 3 gave a spray rating of 95 which after three standard dry cleanings with petroleum naphtha was only reduced to 80. The fabric treated with the product of Example 4 gave a spray rating of 100 which after three dry cleanings was reduced to 80.

In contrast to the products of my copending application Serial Number 392,937 which are produced from formaldehyde, long-chain acid chlorides, nitriles of more than 9 carbon atoms and a tertiary amine, the improved products, obtained from nitriles such as methyleneaminoacetonitrile, are simultaneous reaction products and may be obtained by adding the acid chloride to the initial mixture of formaldehyde, tertiary amine and nitrile. Furthermore, the degree of water-repellency obtained from such nitriles containing less than 9 carbon atoms is consistently high, which is unexpected since long chain compounds as a rule produce greater hydrophobic tendencies than shorter chain compounds. It is probable that more complete reaction with the textile fibers is obtained. The chemical structure of the products of this invention is not known at present.

What I claim is:

1. The process which comprises heating at an elevated temperature, formaldehyde, a nitrile containing less than 9 carbon atoms, a tertiary amine and adding thereto an acid chloride containing a chain of more than 9 carbon atoms; and continuing heating until a reaction product has been obtained which is readily soluble in water.

2. The process which comprises heating at a temperature of from about 50° C. to about 110° C. formaldehyde, a nitrile containing less than 9 carbon atoms, a tertiary amine and adding thereto an acid chloride containing a chain of more than 9 carbon atoms; and continuing heating until a reaction product has been obtained which is readily soluble in water.

3. The process of claim 2 wherein the formaldehyde, nitrile, acid chloride and tertiary amine are heated in the presence of an inert diluent.

4. The process which comprises heating formaldehyde, methyleneaminoacetonitrile, pyridine and octadecanoyl chloride at an elevated temperature until a reaction has occurred to yield a water-soluble product.

5. The process which comprises heating formaldehyde, methyleneaminoacetonitrile, a tertiary amine and an acid chloride having a carbon chain of more than 9 carbon atoms at an elevated temperature until a reaction has occurred to yield a water-soluble product.

6. The process which comprises heating formaldehyde, methyleneaminoacetonitrile, a tertiary amine, and the acid chloride obtained from a mixture of palmitic acid and stearic acids and candelilla wax until a reaction product has been obtained which is soluble in water.

7. The reaction product of a mixture comprising formaldehyde, a nitrile containing less than 9 carbon atoms, an acid chloride containing a chain of more than 9 carbons and a tertiary amine.

8. The reaction product of a mixture comprising formaldehyde, methyleneaminoacetonitrile, octadecanoyl chloride and pyridine.

JOHN B. RUST.